United States Patent [19]
Wilson et al.

[11] Patent Number: 5,250,357
[45] Date of Patent: Oct. 5, 1993

[54] MOISTURE STABLE ELASTOMERIC POLYURETHANE BIASABLE TRANSFER MEMBERS

[75] Inventors: John C. Wilson, Rochester; William B. Vreeland, Webster, both of N.Y.

[73] Assignee: Eastman Kodak Company, Rochester, N.Y.

[21] Appl. No.: 798,454

[22] Filed: Nov. 26, 1991

[51] Int. Cl.$^5$ ............................................. G03G 15/06
[52] U.S. Cl. ................................. 428/425.8; 355/259; 355/274; 428/425.9; 430/127; 524/399; 524/755; 524/765; 524/780
[58] Field of Search ............... 428/425.8, 425.9; 430/127; 524/399, 755, 765, 780; 355/259, 274

[56] References Cited

U.S. PATENT DOCUMENTS

| | | | |
|---|---|---|---|
| 2,807,233 | 9/1957 | Fitch | 118/637 |
| 2,836,725 | 5/1958 | Vyververg | 250/49.5 |
| 2,951,443 | 9/1960 | Byrne | 101/426 |
| 2,969,386 | 1/1961 | McElroy | 260/471 |
| 3,379,687 | 4/1968 | Doss et al. | 260/47 |
| 3,455,855 | 7/1969 | Houghton et al. | 260/18 |
| 3,520,604 | 7/1970 | Shelffo | 355/16 |
| 3,552,972 | 1/1971 | Meyer et al. | 96/87 |
| 3,608,792 | 9/1971 | Hudson | 222/407 |
| 3,620,616 | 11/1971 | Davidson et al. | 355/3 |
| 3,633,543 | 1/1972 | Pitasi et al. | 118/621 |
| 3,694,413 | 9/1972 | Batzer et al. | 260/75 |
| 3,702,482 | 11/1972 | Dolcimascolo et al. | 346/74 ES |
| 3,708,482 | 1/1973 | Lauria et al. | 260/247.7 |
| 3,740,379 | 6/1973 | Sebenda et al. | 528/319 |
| 3,743,684 | 7/1973 | Johnson et al. | 585/261 |
| 3,769,022 | 10/1973 | Ville et al. | 96/114.5 |
| 3,781,105 | 12/1973 | Meagher | 355/3 |
| 3,860,611 | 1/1975 | Krespan | 260/338 |
| 3,920,325 | 11/1975 | Swift | 355/3 |
| 3,954,332 | 5/1976 | Fisher | 355/3 |
| 3,959,573 | 5/1976 | Eddy et al. | 428/425 |
| 3,959,574 | 5/1976 | Seanor et al. | 428/425 |
| 3,969,306 | 7/1976 | Borman et al. | 260/33.6 |
| 4,058,879 | 11/1977 | Lentz et al. | 428/424.7 |
| 4,062,812 | 12/1977 | Safford et al. | 252/500 |
| 4,066,352 | 1/1978 | Kameda et al. | 355/3 TE |

(List continued on next page.)

FOREIGN PATENT DOCUMENTS 2820609 11/1979 Fed. Rep. of Germany.
3223119 12/1983 Fed. Rep. of Germany.

(List continued on next page.)

OTHER PUBLICATIONS

Sieger, H., "Stoichiometric Alakline Earth Salt Complexes of Ethylene Glycols" Tetrahedren Letters, No. 30, pp. 2709–2710, Pergamon Press Ltd. (1978).

(List continued on next page.)

*Primary Examiner*—Paul J. Thibodeau
*Assistant Examiner*—D. S. Nakarani
*Attorney, Agent, or Firm*—Willard G. Montgomery

[57] ABSTRACT

The invention provides rolls, belts and other biasable members having at least one layer or coating of an elastomeric resilient polyurethane formed by reacting (a) a polyisocyanate prepolymer comprising the reaction product of a saturated aliphatic polyisocyanate, a saturated cycloaliphatic polisocyanate, or an aromatic polyisocyanate and a polyol free of aliphatic unsaturation, preferably a polyalkylene glycol in which the alkylene group contains 2 to 8 carbon atoms, and (b) a hardening mixture comprising a polyol of (a) or a diamine free of aliphatic unsaturation, or a mixture thereof and, as a conductivity control agent, from 0.001 to 5.0 weight percent, based on the total weight of (b), of a complex of ethylene glycol or an oligoethylene glycol selected from the group consisting of di-, tri- and tetraethylene glycol with an ionizable antimony halide salt selected from the group consisting of antimony trifluoride, antimony trichloride, antimony tribromide and antimony triiodide.

The resistivity of the elastomeric resilient polyurethane coating on the biasable member is controlled or adjusted to within a desired level of resistivity due to the inclusion of the conductivity control agent in the polyurethane elastomer. Additionally, the inclusion of the conductivity control agent in the polyurethane elastomer reduces the sensitivity of the resistivity of the polyurethane coating on the biasable member to changes in relative humidity.

23 Claims, 1 Drawing Sheet

U.S. PATENT DOCUMENTS

| | | | |
|---|---|---|---|
| 4,113,649 | 9/1978 | Lehmkuhl et al. | 252/188 |
| 4,116,894 | 9/1978 | Lentz et al. | 428/413 |
| 4,177,335 | 12/1979 | Austin et al. | 521/171 |
| 4,182,909 | 1/1980 | Angstadt et al. | 568/574 |
| 4,200,701 | 4/1980 | Wetton et al. | 525/4 |
| 4,272,616 | 6/1981 | Kishimoto | 430/529 |
| 4,303,748 | 12/1981 | Armand et al. | 429/192 |
| 4,309,803 | 1/1982 | Blaszak | 29/130 |
| 4,357,401 | 11/1982 | Andre et al. | 429/192 |
| 4,365,036 | 12/1982 | Lee | 524/299 |
| 4,390,679 | 6/1983 | Weiss et al. | 528/64 |
| 4,404,408 | 9/1983 | Wirth et al. | 568/680 |
| 4,405,741 | 9/1983 | Lee | 524/299 |
| 4,407,739 | 10/1983 | Naarmann et al. | 252/512 |
| 4,436,841 | 3/1984 | Rasshofer et al. | 521/106 |
| 4,438,251 | 3/1984 | Herweh | 528/73 |
| 4,456,548 | 6/1984 | Lewis et al. | 252/500 |
| 4,471,037 | 9/1984 | Bannister | 429/191 |
| 4,476,292 | 10/1984 | Ham et al. | 528/60 |
| 4,476,297 | 10/1984 | Kablitz et al. | 528/486 |
| 4,542,095 | 9/1985 | Steklenski et al. | 430/527 |
| 4,547,440 | 10/1985 | Hopper et al. | 429/112 |
| 4,548,737 | 10/1985 | Ballard et al. | 252/500 |
| 4,556,614 | 12/1985 | le Mehaute et al. | 429/191 |
| 4,618,454 | 10/1986 | Ballard et al. | 252/500 |
| 4,654,267 | 3/1987 | Ugelstad et al. | 428/407 |
| 4,654,279 | 3/1987 | Bauer et al. | 429/192 |
| 4,698,391 | 10/1987 | Yacobucci et al. | 525/162 |
| 4,729,925 | 3/1988 | Chen et al. | 428/425.8 |
| 4,762,941 | 8/1988 | Chen et al. | 558/44 |
| 4,774,265 | 9/1988 | Ugelstad et al. | 521/55 |
| 4,963,616 | 10/1990 | Jenekhe | 524/600 |
| 5,011,739 | 4/1991 | Nielsen et al. | 428/425.8 |

FOREIGN PATENT DOCUMENTS

| | | |
|---|---|---|
| 2568574 | 12/1986 | France . |
| 9100314 | 1/1991 | France . |
| 49-27675 | 7/1974 | Japan . |
| 2-218471 | 8/1990 | Japan . |
| 1071627 | 2/1984 | U.S.S.R. . |
| 2143539 | 2/1985 | United Kingdom . |
| 2205437 | 12/1988 | United Kingdom . |

OTHER PUBLICATIONS

Chemical Abstracts, vol. 88, 1978, p. 44, Abstract No. 88:192130d, Wirth, Hermann O. et al, Complexed Compounds.

Sharma, A. K., et al, "Electron Conduction in Fe–Doped Polystyrene Films" Polymer International vol. 25 (1991) pp. 167–172.

Sharma, A. K., et al. "Electron Transport in Fe-Doped Polyvinyl Acetate Films", British Polymer Journal vol. 22 (1990) pp. 39–45.

Britain, J. W., et al, "Catalysis of The Isocyanate Hydroxyl Reaction", Journal of Applied Polymer Science, vol. IV, No. 11 (1960) pp. 207–211.

Hayakawa, S., "Absorption Spectra of Molecular Compounds of Diethyl Ether with Several Metalic Chlorides", Bulletin of the Chemical Society of Japan, vol. 28, No. 6 (1955), pp. 447–448.

MOISTURE STABLE ELASTOMERIC POLYURETHANE BIASABLE TRANSFER MEMBERS

FIELD OF THE INVENTION

This invention relates generally to the field of electrostatography. More particularly, the invention relates to electrically biasable transfer members for use in electrostatographic transfer processes for transferring toner images from one support surface to another and to methods for their preparation.

BACKGROUND

In electrostatography, an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with charged toner particles. If desired, the toner image can then be transferred to a final support material or receiver such as a web or sheet of paper and affixed thereto to form a permanent record of the original.

Historically, the transfer of toner images between supporting surfaces has been accomplished with the electrostatic transfer of either a corotron or a roller or belt electrode biased to a certain potential, such electrode being referred to as a bias transfer member (roll or belt). In corona-induced transfer as, for example, disclosed by Vandenberg in U.S. Pat. No. 2,836,725, the final support sheet is placed in direct contact with the toner image while the image is supported on the photoconductive surface. The back of the sheet, that is, the side away from the image, is sprayed with a corona discharge having a polarity opposite to that carried by the toner particle causing the toner to be electrostatically transferred to the sheet. The corotron system is relatively simple. The charges deposited electrostatically tack the final support material, such as paper, to the original toner support, such as the photoconductor, in addition to creating the desired electric field affecting transfer of the toner to the paper. However, the strong attraction between the paper and the original toner support makes it mechanically difficult to separate the two supports.

Transfer of developed images from the photoconductor to the final support material with the aid of a biased transfer member, such as a biased transfer roll, as a means of controlling the forces acting on the toner during transfer and of avoiding the severe tacking problems encountered with the use of the corona induction system have been tried with limited success. A bias transfer member is a member for electrically cooperating with a conductive support surface to attract electrically charged particles from the support surface towards the member. Bias transfer members are well known in the art. A bias transfer roll is disclosed by Fitch in U.S. Pat. No. 2,807,233, where a metal roll coated with a resilient coating having a resistivity of at least $10^6$ ohm cm is used as a bias transfer member. Because of the resistivity of the coating, the amount of bias that can be applied to the roll is limited to relatively low operating values because, at the higher ranges, the air in or about the transfer zone begins to break down, i.e., ionizes causing the image to be degraded during transfer. Shelffo, in U.S. Pat. No. 3,520,604, discloses a transfer roll made of a conductive rubber having a resistivity in the range of $10^{16}$ to $10^{11}$ ohm cm. Here, in order to give the roll the needed resiliency required in most practical applications, the coating must be relatively thick. A thick coating of high resistivity acts to build up a surface charge on the roll resulting in air break down in the transfer region and eventually copy degradation.

More recently, improved bias transfer members have been disclosed which reportedly have overcome many of the electrical and image degradation problems associated with some of the previous transfer techniques. Dolcimascolo et al, in U.S. Pat. No. 3,702,482, disclose a multiple layer transfer roll member for transferring xerographic images under controlled conditions. The member is capable of electrically cooperating with a conductive support surface to attract charged toner particles from the support surface towards the member or towards a transfer material such as paper positioned therebetween, the member having a conductive substrate for supporting a biased potential thereon, an intermediate blanket (primary layer) placed in contact with the substrate to the outer periphery of the blanket and a relatively thin outer coating (secondary layer) placed over the blanket layer having an electrical resistivity to minimize ionization of the atmosphere when the transfer member is placed in electrical cooperation with the image support surface and providing a good toner release property enabling the device to be cleaned of the toner. Meagher, in U.S. Pat. No. 3,781,105, discloses a similar transfer member employed in conjunction with a variable electrical bias means for regulating automatically the electrical field levels at various points on the transfer member during the transfer operation and providing constant current control.

In the preferred embodiment, the transfer members disclosed in U.S. Pat. No. 3,702,482 and U.S. Pat. No. 3,781,105, consist of a roller having a central biasable conductive core further having an intermediate blanket or electrically "relaxable" layer (primary layer) surrounding and in electrical contact with the core, and further having a second blanket or electrically "self-leveling" outer layer (secondary layer) surrounding and in electrical contact with the primary layer. Under operating conditions, it is desirable for optimal image transfer to maintain a relatively constant current flow of less than about 30 micro amps in the nip area between the transfer roll surface, transfer material, and photoconductive surface from which a developed image is to be transferred. For this condition to exist at given potentials, the resistivity of the primary and secondary layers must be within critical values and preferably be relatively constant under normally anticipated extremes of operating conditions. Preferably, it has been found that the primary layer should be a resilient elastomeric material having a volume resistivity within the range of $10^7$ to less than $10^{11}$ ohm cm, and the secondary layer should also be a resilient material having a volume resistivity within the range of $10^{11}$ to $10^{15}$ ohm cm.

In practice, it has been found that the elastomeric polyurethane materials which are used in the transfer member, and which exhibit resistivities within the above ranges, or the resistivities of which can be adjusted or controlled to within the above ranges, are moisture sensitive such that the resistivity may vary by as much a factor of 50 between 10% and 80% relative humidity as a function of the amount of moisture absorbed from or lost to the surrounding atmosphere. For example, in the case of the polyurethane materials which are employed as the primary layer and which have exceptionally good electrical characteristics, the volume resistivity may change from $10^{11}$ ohm cm at low moisture contents, i.e., less than about 0.1% moisture, to $10^9$ ohm cm at higher moisture levels, i.e., about 2.5% moisture. Other polyurethanes suitable for use as the secondary layer exhibit resistivity variations from about $10^{15}$ to $10^{13}$ ohm cm as a function of increasing moisture content. The consequent variations in resistivity due to relative humidity effects will ordinarily give rise to erratic performance of the transfer member from day to day particularly in terms of transfer efficiency, i.e., the quality of the image transferred unless compensated for by a concomitant change in the voltages sufficient to maintain a constant nip current, as disclosed by Meagher, in U.S. Pat. No. 3,781,105.

Several attempts have been made in the past to control both the resistivity of such materials to within the critical ranges necessary for optimal image transfer and, at the same time, to reduce the moisture sensitivity of such materials to changes in relative humidity so that the resistivity of the materials remains relatively constant within the ranges required for optimal image transfer. For example, Seanor et al, in U.S. Pat. No. 3,959,574, disclose that the resistivity of the elastomeric materials which constitute the primary layers of the multiple layer transfer roll members of Dolcimascolo et al, can be controlled to within the preferred resistivity range of about $10^7$ to about $10^{11}$ ohm cm and can be rendered less sensitive to changes in relative humidity by the addition of certain ionic compounds or agents to the elastomeric materials. Particularly preferred additives disclosed by Seanor et al are quaternary ammonium compounds, including tetraheptylammonium bromide, trimethyloctadecylammonium chloride, and benzyltrimethylammonium chloride. The additive compounds or agents of Seanor et al are worked into the polyurethane by direct melting of the additive with the polyurethane or by incorporating a solution or dispersion of the additive into the polyurethane. As a result of these methods of incorporation, the additive agents of Seanor et al are not anchored in the elatomeric composition and are leached out of the elastomer over time during normal operating conditions which results in a decline in the level of conductivity in the polyurethane elastomers.

Chen et al, in U.S. Pat. No. 4,729,925, and U.S. Pat. No. 4,742,941 disclose, as coating materials for biasable transfer members, polyurethane elastomers made from certain polyisocyanate prepolymers and polyols in which the resistivity can be maintained between $1.0 \times 10^9$ and $1.0 \times 10^{11}$ ohm cm by copolymerizing with the polyisocyanate prepolymers and polyol hardening compounds used to make the polyurethane elastomers certain polyol charge-control agents formed from certain metal salts complexed with particular polyether diols such as, for example, bis[oxydiethylenebis(polycaprolactone)yl]5-sulfo-1,3-benezenedicarboxylate, methyltriphenylphosphonium salt. Unlike the additive control agents of Seanor et al, the polyol charge-control agents of Chen et al are not prone to being leached out of the elastomer during normal usage since they constitute an integral part of the cured polyurethane elastomer into which they are incorporated by virtue of having been copolymerized with the polyisocyanate prepolymers and polyol components used to make the polyurethane during the preparation of the elastomer. The polyurethane elastomers of Chen et al, however, are moisture sensitive. Reference to curve 2 in FIG. 2 of U.S. Pat. No. 4,729,925, indicates, for example, that the volume resistivity of the conductive polyurethane elastomer of Example 15 prepared from a commercial polyurethane mix and the polyol control agent of Example 10 therein, i.e., bis[oxydiethylenebis(polycaprolactone)yl]-5-sulfo-1,3-benzenedicarboxylate, methyltriphenylphosphonium salt, decreased by a factor of about 6.5 when the relative humidity changed from 25% to about 85%.

In U.S. Pat. No. 5,011,739, issued Apr. 30, 1991, entitled "Moisture Stable Biasable Members and Method for Making Same", to Nielsen et al, there is disclosed, as coating materials for biasable transfer members, certain crosslinked polyurethane elastomers which are not subject to these problems. The coating compositions disclosed in the above-mentioned U.S. Pat. No. 5,011,739, are formed by reacting:

(a) a polyisocyanate prepolymer comprising the reaction product of:
  (i) an aliphatic polyisocyanate, and
  (ii) a polyether polyol selected from the group consisting of a polyalkylene glycol having 2 to 3 carbon atoms in the alkylene group; and (b) a hardening mixture comprising:
  (i) a polyether polyol selected from the group consisting of a polyalkylene glycol having 2 to 3 carbon atoms in the alkylene group and,
  (ii) as a conductivity-control agent for controlling the resistivity of the elastomeric polyurethane, from 0.01 to 3.0 weight percent based on the total weight of (b) of a complex of an oligoethylene glycol selected from the group consisting of di-, tri- and tetraethylene glycol with an ionizable alkali metal salt selected from the group consisting of sodium iodide, lithium iodide and sodium thiocyanate.

The conductivity control agent containing crosslinked polyurethane elastomers described, when used as coating materials for biasable transfer members, provide biasable transfer members capable of electrically cooperating with a conductive support surface to attract charged toner particles towards the member or towards a transfer material such as a sheet of paper positioned between the member and the conductive support in which the volume resistivity not only can be controlled or adjusted to within a specific range necessary for optimal image transfer, (i.e., from about $10^7$ to about $5.0 \times 10^{10}$ ohm cm), but also one in which the resistivity is substantially insensitive to widely varying changes in relative humidity encountered during normal operating conditions such that the resistivity remains relatively constant within the range required for optimal image transfer. Further, since the conductivity control agents utilized by Nielsen et al are covalently bonded to the backbone and/or the crosslinking portion of the polyurethane elastomer during formation or preparation of the elastomer, there also is provided a coating material for use in a biasable transfer member in which the conductivity control agents used therein are not prone or subject to being leached out of the elastomer over time during normal operating conditions thereby causing a decline in the level of conductivity in the polyurethane elastomer.

While the biasable transfer members disclosed and described in aforementioned U.S. Pat. No. 5,011,739 constitute a significant advancement in the art by providing biasable transfer members in which the resistivity not only can be controlled or adjusted to within a specific range necessary for optimal image transfer, but also one in which the resistivity is substantially insensitive to widely varying changes in relative humidity encountered during normal operating conditions such that the resistivity remains relatively constant within the range required for optimal image transfer, it is desired that further advancements in this regard be made, particularly with respect to reducing the sensitivity of the volume resistivity of biasable transfer members to changes in relative humidity. The present invention provides such a biasable transfer member and a method of making same.

SUMMARY OF THE INVENTION

The present invention provides a biasable transfer member, that is, a member capable of electrically cooperating with a conductive support surface to attract charged toner particles from the support surface towards the member. The biasable transfer member comprises a conductive substrate capable of supporting a uniform bias potential thereon and at least one coating comprising a resilient elastomeric polyurethane formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and
(b) a hardening mixture comprising:
  (i) a polyol of (a) (ii) or a diamine free of aliphatic unsaturation, or a mixture thereof; and,
  (ii) as a conductivity-control agent for controlling the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable antimony halide salt selected from the group consisting of antimony trifluoride, antimony trichloride, antimony tribromide and antimony triiodide, the coating being in electrical contact with the conductive substrate and having an electrical resistivity such that the coating is capable of transmitting a bias potential from the substrate to the outer periphery of the coating.

Since the conductivity control agent disclosed and described herein functions to control or alter the resistivity of the elastomeric polyurethane into which it is incorporated, the invention also provides, in another embodiment, a method of controlling the resistivity of a member for electrically cooperating with a conductive support surface such as a photoconductive surface, to attract charged toner particles from the surface towards the member, which method comprises coating a conductive substrate capable of supporting a uniform bias potential thereon with at least one coating of a resilient elastomeric polyurethane, said coating being in electrical contact with the conductive substrate and formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and
(b) a hardening mixture comprising:
  (i) a polyol of (a) (ii) or a diamine free of aliphatic unsaturation, or a mixture thereof; and,
  (ii) as a conductivity control agent to alter the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable antimony halide salt selected from the group consisting of antimony trifluoride, antimony trichloride, antimony tribromide, and antimony triiodide, whereby the elastomeric polyurethane having an altered resistivity is capable of transmitting a bias potential from the substrate to the outer periphery thereof.

By the use of the term "bias transfer member" or "bias transfer roll", is meant a member or roll for electrically cooperating with a conductive support surface to attract electrically charged particles from the support surface towards the member. In particular, a bias transfer roll is one which electrically cooperates with a photoconductive surface or support, such as a photoconductive plate or photoconductor, when brought into contact therewith, to attract charged toner particles from the plate in the direction of the roll. In this manner, the developed images are transferred from the photoconductor to a final support material, such as paper or the like.

Important advantages of the polyurethane coatings of the biasable transfer members of the invention are that they possess the capability to retain pre-established levels of resistivity and exhibit moisture insensitivity.

DESCRIPTION OF THE PREFERRED EMBODIMENTS

Figure 1:
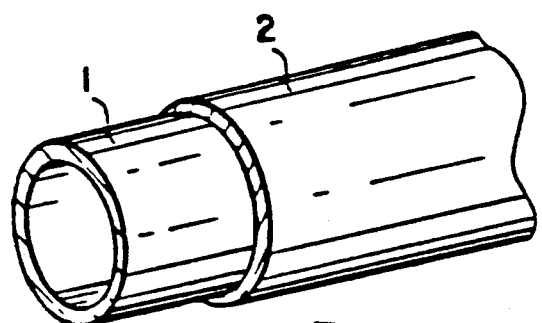
FIG. 1 is a perspective view in partial section showing the construction of a biasable transfer roll of the present invention.

The biasable transfer members of the present invention have application in any suitable electrostatographic device such as, for example, an electrophotographic device, in which a transfer member, more particularly, a bias transfer roll, is used for electrically cooperating with a photoconductive element, plate or surface when brought into contact therewith to attract toner particles bearing an electrostatic charge on the element or plate toward the roll. Transfer is accomplished, as in the prior art, by feeding a sheet of transfer material into the nip region formed by the surface of the transfer roll and the surface of a photoconductive insulating material or element bearing a developed image and imposing a potential on the transfer roll sufficient to cause the transfer of the toner particles or material from the surface of the photoconductive insulating material or element to the adjacent surface of the transfer material. In practice, any source of electrical power connected to the central conductive core of the transfer roll and capable of placing the transfer roll member at a potential sufficient to attract toner images from the photoconductive insulating surface toward the roll may be employed. A more complete discussion of the principles and configurations involved in bias roll transfer may be found in U.S. Pat. Nos. 2,951,443; 3,620,616; 3,633,543; 3,781,105; or 3,708,482.

Referring specifically to FIG. 1, there is shown a cut-away view of a transfer member illustrating the internal construction thereof. The transfer member is in the form of a roll and is basically formed upon a rigid hollow cylinder 1 that is fabricated of a conductive metal, such as aluminum, copper or the like, capable of readily responding to a biasing potential placed thereon. Over core 1 is placed a coating 2 which is a crosslinked or non-crosslinked elastomeric polyurethane containing a conductivity control agent capable of altering or controlling the resistivity of the polyurethane to within a preferred resistivity range consistent with optimal image transfer and which is bonded covalently to the elastomeric network or matrix of the polyurethane, i.e., to the backbone, crosslinking or branched portion of the polyurethane elastomer.

Outer coating 2 which is formed of the resilient elastomeric material can be designed to have a hardness of between about 10 Shore A to about 80 Shore D, and preferably about 15-100 Shore A and may be about 0.125 inch (0.318 cm) to about 0.625 inch (1.58 cm) in thickness, preferably about 0.30 inch (0.762 cm) in thickness, having sufficient resiliency to allow the roll to deform when brought into moving contact with a photoconductive drum surface to provide an extended contact region in which the toner particles can be transferred between the contacting bodies. The elastomeric polyurethane coating should be capable of responding rapidly to the biasing potential to impart electrically the charge potential on the core to the outer extremities of the roll surface. It is preferred that the polyurethane coating have a resistivity of from about $1.0 \times 10^7$ to about $1.0 \times 10^{11}$ ohm cm, and, more preferably, from about $1.0 \times 10^7$ to about $1.0 \times 10^9$ ohm cm, as this has been found to be most consistent with optimal image transfer. This is achieved by including in the crosslinked or non-crosslinked polymeric network of the polyurethane elastomer, the conductivity control agent of the present invention. Because the conductivity control agent is bonded covalently to the elastomeric matrix or network of the polymer, it forms a permanently fixed or integral part of the polymer and will not migrate therefrom in contrast to those prior art conductivity control additives which are worked into the polyurethane by direct melting of the additive into the polyurethane or by incorporating a solution or dispersion of the additive into the polyurethane. As a result, a permanent, or at the very least, a relatively constant degree of resistivity is imparted to the polyurethane elastomer that will not change substantially over time during the course of normal operations. In accordance with the present invention, the coating of the conductive substrate must be formulated of at least one layer of an elastomeric polyurethane having covalently bonded to the crosslinked or non-crosslinked polymeric network thereof, a conductivity control agent capable of altering and/or controlling the resistivity of the elastomer to within the preferred or desired resistivity range. By coating the biasable transfer member with these particular polyurethane elastomers, the resistivity of the biasable transfer member is controlled and, in addition, the sensitivity of the resistivity of the biasable transfer member also is controlled in relationship to changes in relative humidity. Thus, the resistivity of the elastomeric polyurethanes having conductivity control agents to control the resistivity of the polyurethanes used as the outer coating of the bias transfer member of FIG. 1 is less sensitive to changes in relative humidity than elastomeric polyurethanes which are not treated with such agents. Examples of the elastomeric crosslinked or non-crosslinked polyurethane materials having conductivity control agents included in the crosslinked or non-crosslinked polymeric networks thereof as an integral part of the polyurethane material in the manner described in accordance with the invention to control the resistivity of the elastomer and hence the biasable transfer member are set forth below.

The polyurethane elastomers which can be used in accordance with the present invention are known polyurethane elastomers which are made from known starting materials using methods which are well known in the art for making polyurethane elastomers plus the conductivity control agents described herein. The conductivity control agents contain an ionic metal salt to impart conductivity to the elastomers.

The polyurethane elastomers are the chemical reaction products of (a) polyisocyanate prepolymers formed from an isocyanate (specifically a saturated aliphatic polyisocyanate, or a saturated cycloaliphatic polyisocyanate compound, or an aromatic polyisocyanate compound) reacted with a polyol free of aliphatic unsaturation, and (b), a hardener composition comprising a polyol as previously described, or a diamine free of aliphatic unsaturation, or a mixture thereof and an amount of the conductivity control agent described hereinbefore sufficient to control the resistivity of the polyurethane elastomer to within a range of from about $1.0 \times 10^7$ to about $1.0 \times 10^{11}$ ohm cm, and more preferably, from about $1.0 \times 10^7$ to about $1.0 \times 10^9$ ohm cm. The polyurethane elastomers can be crosslinked or non-crosslinked. If a crosslinked polyurethane is desired, such an elastomer can be readily formed by using an excess of polyisocyanate compound in preparing the elastomer or by utilizing a polyisocyanate, a polyol and/or a polyamine having a functionality greater than two in preparing the elastomer.

The polyisocyanate prepolymer can comprise recurring units derived from any suitable polyol with the proviso that the polyol is free of aliphatic unsaturation, including for example, amine-based polyols, polyether polyols, polyester polyols, mixtures thereof, and aromatic as well as saturated aliphatic and saturated cycloaliphatic polyisocyanates provided they do not adversely affect or in any way interfere with the relative humidity sensitivity or with the resistivity of the polyurethane in general. Exemplary polyisocyanate compounds which may be used to make the prepolymer are exemplified by those disclosed in U.S. Pat. Nos. 2,969,386 and 4,476,292, such a 4.4'-diphenylmethane diisocyanate; 1,5-naphthalene diisocyanate; 3-isocyanatomethyl 3,5,5-trimethylcyclohexyl isocyanate (isophorone diisocyanate); methylenebis(4-isocyanatocyclohexane); hexamethylene diisocyanate; 1,3-cyclohexane bis(methylisocyanate); 2,2,4-trimethylhexamethylene diisocyanate, and combinations thereof, as well as related saturated aliphatic and cycloaliphatic polyisocyanates which may be substituted with other organic or inorganic groups that do not adversely affect the course of the polymerization reaction or interfere with the relative humidity sensitivity or with the resistivity of the polyurethane in general. One preferred polyisocyanate is methylenebis(4-isocyanatocyclohexane). Another preferred polyisocyanate is toluene diisocyanate.

The term "aliphatic", as used herein, includes those carbon chains which are substantially non-aromatic in nature. They must be saturated, however, they may be unbranched, branched or cyclic in configuration and may contain various substituents. Exemplary of long chain aliphatic polyisocyanates are dodecane diisocyanate, tridecane diisocyanate, and the like.

The term "aromatic" as used herein, includes a diatropic moiety derived from benzene, naphthalene, anthracene, phenanthrene, biphenyl and the like. They may be unsubstituted or substituted, for example, with halo, nitro, saturated alkyl, saturated alkoxy, saturated alkylthio and aryl substituents. Included in this definition also are alkylene diaryl structures, for example, diphenylmethane and 1,2-diphenylethane. Exemplary of aromatic diisocyanates are toluene-2,4-diisocyanate, m-phenylene diisocyanate, methylene-di-p-phenyl diisocyanate, and the like.

Polyols useful in preparing the polyisocyanate prepolymer and finished polyurethane elastomers are, as previously described, any suitable polyol free of aliphatic unsaturation which will not interfere with the relative humidity sensitivity or with the resistivity of the polyurethane composition or otherwise adversely affect the properties and/or the performance of the polyurethane elastomer in effecting optimal image transfer of the biasable member on which the polyurethane is coated and can include, for example, amine-based polyols, polyether polyols, polyester polyols and mixtures thereof. Examples of such polyols are disclosed in U.S. Pat. Nos. 2,969,386; 3,455,855; 4,476,292 and 4,390,679. One preferred group of polyols are aliphatic polyols and glycols such as glycerol, trimethylolpropane, 1,3-butylene glycol, 1,4-butylene glycol, propylene glycol, hydroxylated castor oils, polyethers such as poly(tetramethylene ether glycols) and poly(propylene ether glycols), low molecular weight polyester polyols, such as polyethylene adipate, and a poly(caprolactone)diol.

A particularly useful polyol which can be used to prepare the polyisocyanate prepolymer and/or chain extend the prepolymer to the final conductive bulk polyurethane is an aliphatic alkylene glycol polymer having an alkylene unit composed of at least two carbon atoms, preferably 2 to 8 carbon atoms. These aliphatic alkylene glycol polymers are exemplified by poly(oxyethylene glycol), poly(oxypropylene glycol), and poly(tetramethylene ether glycol). Di-, tri-, and tetrafunctional compounds are available with the trifunctional ones being exemplified by the reaction product of glycerol or trimethylolpropane and propylene oxide. A typical polyether polyol is available from Union Carbide under the designation PPG-425.

Another preferred group of polyols are amine-based polyols. A wide variety of aromatic and aliphatic diamines may form part of the amine-based polyols. Such polyols include N,N,N'N'-tetrakis(2-hydroxypropyl)ethylenediamine and a polymer of ethylene diamine, propylene oxide and ethylene oxide. A typical aromatic amine-based polyol is available from Upjohn under the designation ISO-NOL 100; a typical aliphatic amine-based polyol is available from BASF under the designation QUADROL and a typical ethylene diamine/propylene oxide/ethylene oxide polymer is available from BASF under the designation PLURACOL 355.

In general, suitable polyols useful for preparing the prepolymer and/or chain extending the prepolymer to the final conductive bulk polyurethane will have molecular weights of from about 60 to 10,000, typically, from about 500 to 3000.

Preferred concentration ranges for the respective components of the prepolymer are 5–40% by weight of polyisocyanate and 60–95% by weight polyol, based on the total weight of the prepolymer, to form a resin prepolymer.

The final conductive bulk polyurethane elastomer is produced by chain-extending and/or crosslinking the prepolymer with a hardener composition comprising at least one additional polyol or blends of polyols of the type aforedescribed and discussed hereinabove and the conductivity control agents described hereinbefore.

The polyol hardener system comprises at least one polyol of the type aforedescribed, such as, for example, an amine-based polyol or a polyether polyol previously identified and defined hereinabove or blends of these polyols.

A preferred polyol is poly(tetramethylene ether glycol) having added thereto about 0.001 to about 5.0 weight percent of the total polyol hardener system of the ionic polyol conductivity control agent as described hereinbefore.

Alternatively, in lieu of, or in addition to, utilizing a polyol of the type and kind described hereinabove in the hardener compositions used to form the presently described polyurethane elastomers, an aliphatic or cycloaliphatic diamine free of aliphatic unsaturation or an aromatic diamine free of aliphatic unsaturation can be used in the hardener composition provided they do not interfere with the relative humdity sensitivity or with the resistivity of the polyurethane elastomer composition or otherwise adversely affect the properties and/or the performance of the polyurethane elastomer in effecting optimal image transfer of the biasable member on which the polyurethane is coated along with the conductivity control agent described hereinbefore. Exemplary diamines which can be used in the hardener compositions of the present invention include 4,4'-methylenebis(o-chloroaniline), phenylenediamine, bis(4-aminocyclohexyl)methane, isophoronyldiamine, and the reaction products of anhydrides with such amines as described in U S. Pat. No. 4,390,679. Preferred such diamines are 4,4'-methylenebis(o-chloroaniline), diethyltoluenediamine available commercially from Ethyl Corporation, 451 Florida Blvd., Baton Rouge, La. under the trade name Ethacure 100 and di(methylthio)2,4-toluenediamine, also available commercially from Ethyl Corporation under the tradename Ethacure 300.

Such diamines serve to chain extend the prepolymer to the final conductive bulk polyurethane. Suitable such diamines will typically have molecular weights ranging from about 60 to about 500, and are employed in the hardener compositions alone having added thereto from about 0.001 to about 5.0 weight percent of the conductivity control agent described hereinabove or as a blend in combination with one or more of the aforedescribed polyol components in weight ratios of polyamine to polyol ranging from 1:1 to 1:10 having added thereto from about 0.001 to about 5.0 weight percent of the total polymer of the conductivity control agent aforedescribed.

The polyurethanes are prepared by admixing the prepolymer with the polyol hardener. Catalysts and optional additives also can be included within the hardener or the prepolymer with the provision that they do not interfere with the relative humidity sensitivity or with the volume resistivity of the polyurethane.

In general, if the hardener contains stoichiometric equivalents less than that contained in the prepolymer, a crosslinked polyurethane elastomer will result. On the other hand, if the hardener contains stoichiometric equivalents greater than or equivalent to that contained in the prepolymer, then a non-crosslinked polyurethane elastomer will result. This only applies, however, if all the components in the prepolymer and the hardener are difunctional. If any component, either in the hardener composition or in the prepolymer composition has a functionality greater than two, then the resultant polyurethane elastomer will always be crosslinked. Further, and if desired, instead of preparing the polyurethane elastomers of the present invention by first forming a polyisocyanate prepolymer and a hardening mixture and then reacting the two together, all of the starting materials required to form the polyurethane elastomers of the present invention may simply be added together, reacted and cured in a "one-shot" method of preparation. Or, still further, the conductivity control agent described hereinabove may be added to the polyisocyanate prepolymer instead of the hardener and the prepolymer containing the conductivity control agent and the hardener reacted together to form the polyurethane elastomers of the present invention. If either of these two methods of preparation are used, amounts of conductivity control agent in the range of from about 0.001 to about 5.0 weight percent, based on the total weight of the resultant polyurethane, generally will be appropriate for adjusting the resistivity of the polymeric elastomer to within the desired limits.

Catalysts known to those skilled in the art which may be included in the hardener composition may comprise, for example, heavy metals utilized in amounts of about 0.001 to about 0.5% metal, by weight, preferably about 0.1% metal, by weight, of hardener, e.g., organotin, organozinc, mercury, cadmium and lead compounds. Tertiary amines may also be utilized.

Examples of some typical catalysts which may be included in the hardener composition include cadmium 2-ethylhexanoate, cerium 2-ethylhexanoate, chromium 2-ethylhexanoate, cobalt 2-ethylhexanoate, cobalt neodecanoate, copper acetylacetonate, iron stearate, magnesium oleate, manganese 2-ethylhexanoate, molybdenum 2-ethylhexanoate, nickel acetylacetonate, nickel 2-ethylhexanoate, zinc 2-ethylhexanoate, zirconium 2-ethylhexanoate, dibutyltin dilaurate, bismuth 2-ethylhexanoate, bismuth neodecanoate, and the like.

Optional additives or addenda which may be included in the hardener composition may comprise, for example, anti-foaming agents such as glycerine, and ethyl acrylate-2-ethylhexyl acrylate copolymer, dimethyl siloxane copolymers and other silicones such as SAG-47 commercially available from Union Carbide Company; antioxidants, such as esters of $\beta$-(3,3-ditert-butyl-4-hydroxyphenyl)propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris(hydroxyethyl)isocyanurate, and di(hydroxyethyl oxalic) acid diamide; UV absorbers and light stabilizers such as 2-(2'-hydroxyphenyl)benzyltriazoles and sterically hindered amines such as bis(2,2,6,6-tetramethylpiperidyl)-sebacate, bis(1,2,2,6,6-pentamethylpiperidyl)sebacate, n-butyl-3,5-di-tert-butyl-4-hydroxybenzyl malonic acid bis(1,2,2,6,6-pentamethylpiperidyl)ester, condensation product of 1-hydroxyethyl-2,2,6,6-tetramethyl-4-hydroxypiperidine and succinic acid, condensation product of N,N'bis(2,2,6,6-tetramethylpiperidyl)hexamethylenediamine, and 4-tert-octylamino-2,6-dichloro-1,3,5-s-triazine, tris(2,2,6,6-tetramethylpiperidyl)nitrolotriacetate, tetrakis(2,2,6,6-tetramethyl-4-piperidyl)-1,2,3,4-butanetetracarbonic acid and 1,1'-(1,2-ethanediyl)-bis (3,3,5,5-tetramethylpiperazinone); plasticizers such as phthalates, adipates, glutarates, epoxidized vegetable oils, and the like; fungicides, pigments, dyes; reactive dyes; moisture scavengers; and the like.

The prepolymer-hardener mixtures prior to curing, exhibit sufficiently low viscosities to facilitate mixing, pouring and air bubble diffusion, thereby allowing for the formation of bubble free castings in the configuration of a transfer roller or belt.

Two-component polyurethane mixes of the type described above into which the conductivity control agents of the invention can be incorporated are commercially available. Examples of such commercially available polyurethane systems include CONATHANE TU-500 and CONATHANE TU-400 available from Conap, Inc., Olean, N.Y., and a system sold by Winfield Industries, Inc., Buffalo, N.Y., under the trade name Winthane W643.

The degree of conductivity imparted to the polymer will vary depending primarily upon the amount of conductivity control agent included in the combination of starting materials and the inherent properties of the given polymer and crosslinking agent, if employed, (i.e., the degree of conductivity the polymer would have if no conductivity control agent were included). Any amount of the conductivity control agent sufficient to adjust or alter the resistivity of the elastomeric polyurethane material to within the desired limits, i.e., from higher levels of resistivity to a resistivity in the range of from about $1.0 \times 10^7$ to about $1.0 \times 10^{11}$ ohm cm, or within the range itself, may be used in accordance with the present invention. Resistivities in this range have been found to be consistent with optimal image transfer efficiency. In general, as previously mentioned, concentrations in the range of about 0.001 to 5.0 percent by weight, based on the total weight of the elastomeric polyurethane, have been found to be appropriate for adjusting the resistivity of the polymer to within the desired limits.

Higher amounts of the conductivity control agent may be used, however, to control the resistivity of the polyurethane elastomer, the only limitation being the desired resistivity of the elastomeric polyurethane for use as a coating material upon the conductive substrate of the biasable transfer member.

The conductivity control agent is simply included in the desired amount in the combination of starting materials, most typically as a component of the hardener composition and covalently bonds to the polymer matrix, i.e., to the backbone and/or a crosslinking and/or a branched portion of the polymer during the normal process of elastomer preparation as is explained more fully below.

The conductivity control agents of the invention are comprised of ethylene glycol or a low molecular weight oligoethylene glycol, specifically diethylene glycol, triethylene glycol, or tetraethylene glycol, complexed with an ionizable antimony halide salt selected from the group consisting of antimony trifluoride, antimony trichloride, antimony tribromide, and antimony triiodide. Such complexes can be prepared by dissolving an ionizable antimony halide, such as antimony trichloride, and ethylene glycol or a low molecular weight oligoethylene glycol, specifically diethylene glycol, triethylene glycol or tetraethylene glycol, in a suitable solvent, such as methanol, for example, and subsequently evaporating the solvent. The resultant material is believed to be comprised of a complex of the antimony halide with the ethylene glycol or the low molecular weight oligoethylene glycol, aforedescribed. In practice, it is advantageous to include an excess of the oligomer in order to reduce the viscosity of the proposed complex. Optionally, the conductivity control agent may be prepared in the absence of solvent.

It is important to point out that both antimony tribromide and antimony triiodide are subject to decomposition upon exposure to water or moisture. Therefore when these conductivity control agents are used in preparing the polyurethane elastomers of the present invention, it is necessary to carry out the preparation of the elastomers in the absence of water as, for example, in an inert atmosphere.

As mentioned previously, the conductivity control agent bonds covalently to the polymeric matrix or network. This is achieved by reaction of the hydroxyl groups of the conductivity control agent with excess isocyanate present in the prepolymer which form urethane linkages in the backbone and/or crosslinking and/or branched portions of the polymer thereby firmly anchoring the conductivity control agent in the polymeric network. This enables the polymer to retain a relatively constant degree or level of resistivity which will not change substantially (e.g., decrease) over time during use.

In addition, the conductivity control agents used in the present invention for controlling or adjusting the resistivity of the polyurethane elastomers which form the coatings on the conductive substrates of the biasable transfer members of the invention also significantly reduce the sensitivity of the resistivity of the polyurethane to changes in the relative humidity.

By a significant reduction in the sensitivity of the resistivity to changes in relative humidity is meant a reduction of its sensitivity of at least about 89 percent.

The relative humidity sensitivities of the elastomeric polyurethanes used in the invention for making biasable transfer members by coating a conductive substrate for supporting a uniform bias potential thereon with at least one coating of the elastomeric polyurethane have been obtained by measuring the volume resistivity of the polyurethanes at a relative humidity of 0% and a relative humidity of 100%. The ratio of the resistivity of a relative humidity of 0% to the resistivity at a relative humidity of 100% is the relative humidity sensitivity. This relative humidity sensitivity also is referred to as the relative humidity swing. The ratio of the sensitivity at a relative humidity of 0% and a relative humidity of 100%, should be about 1 to 10 to provide a suitable biasable transfer member in accordance with the present invention. Ideally, the ratio should be 1. As mentioned above, in addition to the desirability of having a low relative humidity swing, the elastomeric polyurethanes useful for biasable transfer members must also have a resistivity of from about $1.0 \times 10^7$ to about $1.0 \times 10^{11}$ ohm cm, and preferably from about $1.0 \times 10^7$ to about $1.0 \times 10^9$ ohm cm. In the event a particular elastomeric polyurethane has a resistivity higher than the desired resistivity, the resistivity may be adjusted by the inclusion of a suitable amount of conductivity control agent to adjust the resistivity of the particular polymeric material as described previously.

As mentioned previously, the hardness of the elastomeric polyurethanes of the invention is between about 10 Shore A to about 80 Shore D, and preferably about 15-100 Shore A. The control of the hardness is within the purview of those skilled in the art and the hardness can be controlled by such parameters as by varying the type and amount of reactants used and by using various additives such as plasticizers.

In accordance with the invention, there is described the method of controlling the resistivity of a biasable transfer member. There also is described a method of reducing the sensitivity of the resistivity of the elastomeric polyurethanes to changes in relative humidity by coating a conductive substrate for supporting a uniform bias potential thereon with at least one layer of an elastomeric polyurethane having a conductivity control agent included therein characterized by being bonded covalently to the polymeric network or matrix of the elastomer to control resistivity and having a resistivity of from about $1.0 \times 10^7$ to about $1.0 \times 10^{11}$ ohm cm, and preferably from about $1.0 \times 10^7$ to about $1.0 \times 10^9$ ohm cm. The coating can be applied to the substrate by any suitable method or technique known in the art including spraying, casting in molds, affixing sheets of the material to the substrate member by suitable mechanical means or by suitable cement, and the like.

The following examples and comparative tests illustrate more clearly the elastomeric polyurethane materials which may be used in preparing the biasable transfer members of the present invention and for controlling the resistivity of the biasable transfer members of the present invention, including controlling the sensitivity of the resistivity to changes in relative humidity although the invention is not to be construed as limited in scope thereby.

SAMPLE PREPARATION

Slabs of the particular elastomeric polyurethanes to be tested were cast in a stainless steel mold in sheets to a thickness of 0.075 inch (0.190 cm) or 0.25 inch (0.635 cm). Samples of the various cast materials were placed in controlled humidity chambers for a designated number of days. One set of chambers was maintained at a relative humidity of 0% and another set of chambers was maintained at a relative humidity of 100%. A 0% relative humidity environment was obtained by suspending the test samples in a sealed jar containing 1 inch Drierite at 24° C. A 100% relative humidity environment was obtained by suspending the samples over water in a sealed jar at 24° C. The samples were suspended in the chambers in such a way that both sides were available to the atmosphere. In this manner, the samples would have taken up very close to the equilibrium amounts of water within 14 to 17 days. After reaching equilibrium, the . volume resistivity of the samples were measured according to the procedure of ASTM Standard D-257 by placing the samples between two soft electrodes of a known surface area, applying a 1 kilovolt DC bias from a Trek 610C Cor-A-Trol (high voltage supply) to one electrode and measuring the current from the second electrode using a Kiethly 485 Picoammeter. Values are reported in ohm cm.

The resistivities measured at both 0% and 100% relative humidity were recorded. For the designated examples below, the ratio of the resistivity at 0% relative humidity to the resistivity at 100% relative humidity was determined. The resulting ratio was designated as the RH sensitivity or RH swing and is reported as RH sensitivity in Table 1 below where resistivity at 0% and 100% relative humidities is also designated for the various samples tested.

Example 1

This example describes the preparation of a conductivity control agent useful in accordance with the invention which is a diethylene glycol-antimony trichloride complex.

A complex of diethylene glycol and antimony trichloride was prepared by slowly adding with agitation 22.81 g (0.10 mol) of antimony trichloride to a 500 ml, single-neck round bottom flask containing 100 ml of dry methanol with dry methanol rinse. The addition process was slightly exothermic and resulted in a colorless solution. Next, 31.84 g (0.30 mol) of diethylene glycol was added to the flask with agitation. The resultant solution was concentrated in vacuo with steam bath heating to give 54.18 g of a colorless viscous oil (99.14% of theory) characterized by combustion analysis as diethylene glycol complexed with antimony chloride.

Anal. Calcd. for $C_{12}H_{30}O_9SbCl_3$: C, 26.38;H, 5.53; Cl, 19.46;

Found: C, 26.37; H, 5.62; Cl, 19.48.

Example 2

This example describes the preparation of a crosslinked 50 Durometer Shore A hardness elastomeric polyurethane of the invention containing the conductivity control agent prepared in accordance with Example 1.

A 500 ml resin kettle was charged with 59.69 g (0.048 mol) of poly(caprolactone)diol; Mn=1250, obtained commercially from Aldrich Chemical Co., Inc., and 32.90 g (0.125 mol) of methylenebis(4-isocyanatocyclohexane), obtained commercially under the trade name Desmodur W from Mobay Corporation. The mixture was mechanically stirred under nitrogen at 80° C. for seventy minutes. Next, 59.64 g (0.048 mol) of poly(caprolactone)diol and 2.23 g (0.0125 mol) of an isomeric mixture of diethyltoluenediamine, obtained commercially under the trade name Ethacure 100 from Ethyl Corporation, were added to the kettle along with 1.08 g of the antimony trichloride-diethylene glycol conductivity control agent prepared in accordance with the procedure of Example 1. The mixture was mechanically stirred for thirty seconds. The entrapped air was removed under reduced pressure and the mixture was poured into a prepared stainless steel mold which was placed into an 80° C. hot air oven for three hours. The resulting slab was removed from the mold and post cured at 80° C. in a hot air oven for seventy-two hours. The slab was then removed from the oven, removed from the mold, cooled to room temperature and the resistivities of the resultant slab molded to a thickness of 0.075 inch (0.19 cm) were measured as described above at the two designated relative humidities and the relative humidity sensitivity was determined after an equilibration time of fourteen days in a relative humidity chamber. The results are shown in Table I, Example 2 below.

Example 3

This example describes the preparation of a linear, non-crosslinked 63 Durometer Shore A hardness thermoplastic polyurethane containing the conductivity control agent prepared in accordance with Example 1.

Commercially available poly(tetramethylene ether glycol); 140.0 g (0.140 mol), obtained under the trade name Terathane 1000 from E.I. DuPont de Nemours Company (Mn=1000), was dried in a three-neck, 500 ml round bottom flask equipped with a Teflon blade stirrer at room temperature in vacuo (approximately 1.00 mm) for approximately 30 minutes. Next, 52.47 g (0.20 mol) of methylenebis(4-isocyanatocyclohexane), obtained commercially under the trade name Desmodur W from Mobay Corporation, along with 0.16 g of dibutyltin dilaurate were added to the flask and the reaction mixture was heated in an 80° C. bath under nitrogen for 70 minutes to form the isocyanate terminated prepolymer. An isomeric mixture of 7.84 g (0.044 mol) of diethyltoluenediamine, obtained commercially under the trade name Ethacure 100 from Ethyl Corporation, was added along with 2.91 g of the antimony trichloride-diethylene glycol conductivity control agent prepared in accordance with the procedure of Example 1. The mixture was stirred for approximately 5 minutes in an 80° C. bath, degassed under reduced pressure and poured into a stainless steel mold. The polymer was cured in an 80° C. oven for approximately 20 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of seventeen days in a relative humidity chamber. The results are shown in Table I, Example 3 below.

Comparative Example 4

This example describes the prepration of the linear, non-crosslinked polyurethane elastomer of Example 3 without the conductivity control agent of Example 1, as a control, and the resistivity and relative humidity sensitivity of the elastomer as measured in accordance with the procedure described in Example 3.

A mixture of 140.0 g (0.140 mol) of commercially available poly(tetramethylene ether glycol), obtained under the trade name Terathene 1000 from E.I. DuPont de Nemours Company (Mn=1000), was dried in a three-neck, 500 ml round bottom flask equipped with a Teflon blade stirrer at room temperature in vacuo (approximately 1.00 mm) for approximately 30 minutes. Next, 52.47 g (0.20 mol) of methylenebis(4-isocyanatocyclohexane), obtained commercially under the trade name Desmodur W from Mobay Corporation, along with 0.16 g of dibutyltin dilaurate were added to the flask and the reaction mixture was heated in an 80° C. bath under nitrogen for seventy minutes to form the isocyanate terminated prepolymer. An isomeric mixture of 7.84 g (0.044 mol) of diethyltoluenediamine, obtained commercially under the trade name Ethacure 100 from Ethyl Corporation, was added along with 1.70 g (0.016 mol) of diethylene glycol in place of the conductivity control agent of Example 1 to insure that a polyurethane elastomer of the same stoichiometric balance as that produced in Example 3, but devoid of any conductivity control agent of the present invention, was obtained. The mixture was stirred for approximately 5 minutes in an 80° C. bath, degassed under reduced pressure and poured into a stainless steel mold. The polymer was cured in an 80° C. oven for approximately 20 hours, demolded, cooled to room temperature and the resistivities of the resultant slab molded to a thickness of 0.25 and (0.635 cm) were measured as described above at the two designated relative humidities and the relative humidity sensitivity was determined after an equilibration time of fourteen days in a relative humidity chamber. The results are shown in Table I, Example 4 below.

TABLE I

Humidity Sensitivities of Polyurethane Elastomers of Examples 2-4

| Examples | Resistivity at Designated Relative Humidity | | Time (Days) | RH Sensitivity |
|---|---|---|---|---|
| | 0% | 100% | | |
| Example 2 | $2.50 \times 10^9$ | $5.45 \times 10^8$ | 14 | 4.59 |
| Example 3 | $3.55 \times 10^9$ | $1.17 \times 10^9$ | 17 | 3.03 |
| Comparative Example 4 | $5.90 \times 10^{12}$ | $2.22 \times 10^{11}$ | 14 | 26.58 |

The reduction in resistivity by the use of the conductivity control agents of the invention, as well as the resulting reduction in RH sensitivity, is clearly shown in Table I by comparing the resistivity and the RH sensitivity of the polyurethane elastomer of Comparative Example 4, without a conductivity control agent of the present invention, to the resistivity and the RH sensitivity of the polyurethane elastomer of Example 3 consisting of the same polyurethane elastomer as Example 4, but containing a conductivity control agent of the present invention.

The polyurethane elastomers are capable of being made into shaped articles such as transfer rollers and belts in which the resistivity can be maintained at from about $1.0 \times 10^7$ to about $1.0 \times 10^{11}$ ohm cm. Such shaped articles exhibit toughness, high elongation, high tensile strength, high tear strength and excellent abrasion resistance. The shaped articles can be designed to have a hardness ranging from 10 Shore A to about 80 Shore D. For use in making electrically biasable transfer rollers and belts, a Shore hardness of about 15–100 Shore A Durometers is preferred.

Method of Making Transfer Rollers

Transfer rollers can be made from any one of a number of commercially available polyurethane two-component mixes to which a conductivity control agent of the invention is added. Examples include CONATHANE TU-400, CONATHANE TU-500 and CONATHANE TU-900 to which a polyol conductivity control agent of the invention can be added, for example, at between about 0.001 and 5.0% by weight of the total weight of the hardener composition of Part B of the mix. This results in a roller resistivity of from about $1.0 \times 10^7$ to about $1.0 \times 10^{11}$ ohm cm. In general, the polyurethanes used are the two-component types comprising A and B. Part A is the polyisocyanate prepolymer. Part B is the hardener. The conductivity control agent typically is added to Part B of the mix.

Although Applicants have referred to the biasable member coating materials of the invention throughout as polyurethane materials, it is to be understood that in the strictest sense, when a polyamine is present in the hardening composition, the resultant elastomeric material will be comprised of a polyurethane/polyurea elastomer.

The invention has been described in detail with particular reference to preferred embodiments thereof, but it will be understood that variations and modifications can be effected within the spirit and scope of the invention.

We claim:

1. A member for electrically cooperating with a conductive support surface to attract charged toner particles from the surface towards the member comprising a conductive substrate capable of supporting a uniform bias potential thereon and at least one coating comprising an elastomeric polyurethane formed by reacting:
   (a) a polyisocyanate prepolymer comprising the reaction product of:
      (i) a saturated aliphatic polyisocyanate, a saturated cycloaliphatic polyisocyanate or an aromatic polyisocyanate; and
      (ii) a polyol free of aliphatic unsaturation; and
   (b) a hardening mixture comprising:
      (i) a polyol of (a) (ii) or a diamine free of aliphatic unsaturation, or a mixture thereof; and
      (ii) as a conductivity control agent for controlling the resistivity of the elastomeric polyurethane to within a range of from about $1.0 \times 10^7$ to about $1.0 \times 10^{11}$ ohm cm and for imparting a relative humidity sensitivity to the elastomeric polyurethane of from about 1 to about 10, from 0.001 to 5.0 weight percent, based on the total weight of (b), of a complex of ethylene glycol or an oligoethylene glycol selected from the group consisting of di, tri- and tetraethylene glycol with an ionizable antimony halide salt selected from the group consisting of antimony trifluoride, antimony trichloride, antimony tribromide and antimony triiodide, the coating being in electrical contact with the conductive substrate and having an electrical resistivity such that the coating is capable of transmitting a bias potential from the substrate to the outer periphery of the coating.

2. The member of claim 1 wherein the elastomeric polyurethane coating has a resistivity of from about $1.0 \times 10^7$ to about $1.0 \times 10^9$ ohm cm.

3. The member of claim 1 wherein the elastomeric polyurethane has a hardness of between about 10 Shore A and about 80 Shore D.

4. The member of claim 1 wherein the conductive substrate having a coating of elastomeric polyurethane is formed of a conductive metal in the shape of an endless belt.

5. The member of claim 1 wherein the conductive substrate having a coating of elastomeric polyurethane is formed of a conductive metal in the shape of a roll.

6. The member of claim 1 wherein (a) the polyisocyanate in the prepolymer is methylenebis(4-isocyanatocyclohexane), hexamethylene diisocyanate or toluene diisocyanate and (b) the polyol is poly(oxyethylene glycol), poly(oxypropylene glycol), poly(tetramethylene ether glycol) or mixtures thereof.

7. The member of claim 1 wherein (a) the polyisocyanate in the prepolymer is methylenebis(4-isocyanatocyclohexane) and (b) the polyol is poly(tetramethylene ether glycol).

8. The member of claim 1 wherein the conductivity control agent is a complex of antimony trichloride and diethylene glycol.

9. The member of claim 1 wherein the conductivity control agent is a complex of antimony trichloride and tetraethylene glycol.

10. The member of claim 1 wherein the conductive support surface comprises a photoconductor.

11. A method of controlling the resistivity of a member for electrically cooperating with a conductive support surface to attract charged toner particles from the surface towards the member comprising coating a conductive substrate capable of supporting a uniform bias potential thereon with at least one layer of an elastomeric polyurethane, said coating being in electrical contact with the conductive substrate and formed by reacting:

(a) a polyisocyanate prepolymer comprising the reaction product of:
 (i) a saturated aliphatic polyisocyanate, a saturated cycloaliphatic polyisocyanate or an aromatic polyisocyanate; and
 (ii) a polyol free of aliphatic unsaturation; and
(b) a hardening mixture comprising:
 (i) a polyol of (a)(ii) or a diamine free of aliphatic unsaturation, or a mixture thereof; and,
 (ii) as a conductivity control agent for controlling the resistivity of the elastomeric polyurethane to within a range of from about $1.0 \times 10^7$ to about $1.0 \times 10^{11}$ ohm cm and for imparting a relative humidity sensitivity to the elastomeric polyurethane of from about 1 to about 10, from 0.001 to 5.0 weight percent, based on the total weight of (b), of a complex of ethylene glycol or an oligoethylene glycol selected from the group consisting of di-, tri- and tetraethylene glycol with an ionizabale antimony halide salt selected from the group consisting of antimony trifluoride, antimony trichloride, antimony tribromide and antimony triiodide, whereby the elastomeric polyurethane having an altered resistivity is capable of transmitting a bias potential from the substrate to the outer periphery thereof.

12. The method of claim 11 wherein the resistivity of the elastomeric polyurethane having the conductivity control agent included therein is from about $1.0 \times 10^7$ to about $1.0 \times 10^9$ ohm cm.

13. The method of claim 11 wherein (a) the polyisocyanate in the prepolymer is methylenebis (4-isocyanatocyclohexane), hexamethylene diisocyanate or toluene diisocyanate and (b) the polyol is poly(oxyethylene glycol), poly(oxypropylene glycol) poly(tetramethylene ether glycol) or mixtures thereof.

14. The method of claim 11 wherein (a) the polyisocyanate in the prepolymer is methylenebis(4-isocyanatocyclohexane) and (b) the polyol is poly(tetramethylene ether glycol).

15. The method of claim 11 wherein the conductivity control agent is a complex of antimony trichloride and diethylene glycol.

16. The method of claim 11 wherein the conductivity control agent is a complex of antimony trichloride and tetraethylene glycol.

17. The method of claim 11 wherein the conductive support surface comprises a photoconductor.

18. A method of preventing changes in the resistivity of members for electrically cooperating with a conductive support surface to attract charged toner particles from the surface towards the members caused by changes in relative humidity comprising applying at least one coating of an elastomeric polyurethane formed by reacting:

(a) a polyisocyanate prepolymer comprising the reaction product of:
 (i) a saturated aliphatic polyisocyanate, a saturated cycloaliphatic polyisocyanate or an aromatic polyisocyanate; and
 (ii) a polyol free of aliphatic unsaturation; and
(b) a hardening mixture comprising:
 (i) a polyol of (a) (ii) or a diamine free of aliphatic unsaturation, or a mixture thereof; and
 (ii) as a conductivity control agent for controlling the resistivity of the elastomeric polyurethane to within a range of from about $1.0 \times 10^7$ to about $1.0 \times 10^{11}$ ohm cm and for imparting a relative humidity sensitivity to the elastomeric polyurethane of from about 1 to about 10, from 0.001 to 5.0 weight percent, based on the total weight of (b), of a complex of ethylene glycol or an oligoethylene glycol selected from the group consisting of di-, tri- and tetraethylene glycol with an ionizable antimony halide salt selected from the group consisting of antimony trifluoride, antimony trichloride, antimony tribromide and antimony triiodide, to a cylindrical core of electrically conductive material for electrically cooperating with the conductive support surface when brought into contact therewith whereby the elastomer is capable of transmitting a bias potential from the core of electrically conductive material to the outer periphery thereof and significant reductions in the sensitivity of the resistivity to changes in relative humidity occur.

19. The method of claim 18 wherein (a) the polyisocyanate in the prepolymer is methylenebis (4-isocyanatocyclohexane), hexamethylene diisocyanate or toluene diisocyanate, and (b) the polyol is poly(oxyethylene glycol), poly(oxypropylene glycol), poly(tetramethylene ether glycol) or mixtures thereof.

20. The method of claim 18 wherein (a) the polyisocyanate in the prepolymer is methylenebis (4-isocyanatocyclohexane) and (b) the polyol is poly(tetramethylene ether glycol).

21. The method of claim 18 wherein the conductivity control agent is a complex of antimony trichloride and diethylene glycol.

22. The method of claim 18 wherein the conductivity control agent is a complex of antimony trichloride and tetraethylene glycol.

23. The method of claim 18 wherein the conductive support surface comprises a photoconductor.

* * * * *